(12) United States Patent
McCluskey et al.

(10) Patent No.: US 7,707,094 B1
(45) Date of Patent: Apr. 27, 2010

(54) SYSTEM AND METHOD FOR ELECTRONICALLY SOURCING PRODUCTS

(75) Inventors: Joseph A. McCluskey, Arlington Heights, IL (US); Ronald E. Paulson, Gurnee, IL (US); Sandra Skillen, West Dundee, IL (US); Alisa Lynn Fifield, Chicago, IL (US); Alex Zelinski, Lake Villa, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 2766 days.

(21) Appl. No.: 09/705,559

(22) Filed: Nov. 2, 2000

(51) Int. Cl.
*G06Q 40/00* (2006.01)
(52) U.S. Cl. .......................... 705/37; 705/38
(58) Field of Classification Search ............. 705/26–27, 705/37–38, 3; 707/5, 103
See application file for complete search history.

(56) References Cited

U.S. PATENT DOCUMENTS

| | | | | |
|---|---|---|---|---|
| 5,842,178 | A * | 11/1998 | Giovannoli | 705/26 |
| 5,924,074 | A * | 7/1999 | Evans | 705/3 |
| 6,055,516 | A * | 4/2000 | Johnson et al. | 705/27 |
| 6,115,641 | A * | 9/2000 | Brown et al. | 700/102 |
| 6,304,864 | B1 * | 10/2001 | Liddy et al. | 706/15 |
| 6,330,542 | B1 * | 12/2001 | Sevcik et al. | 705/8 |
| 6,366,906 | B1 * | 4/2002 | Hoffman | 707/3 |
| 6,651,052 | B1 * | 11/2003 | Westphal | 707/3 |
| 7,089,236 | B1 * | 8/2006 | Stibel | 707/5 |
| 2001/0044758 | A1 * | 11/2001 | Talib et al. | 705/27 |
| 2001/0047311 | A1 * | 11/2001 | Singh | 705/26 |
| 2004/0044591 | A1 * | 3/2004 | Gilliland et al. | 705/27 |
| 2004/0059645 | A1 * | 3/2004 | Wirth, Jr. | 705/27 |

OTHER PUBLICATIONS

Mullich J., E-Catalogs Bulk Up, Internetweek 43, Mar. 27, 2000, 4 pags.*

* cited by examiner

*Primary Examiner*—Thu Thao Havan
(74) *Attorney, Agent, or Firm*—Gary R. Jarosik

(57) ABSTRACT

A system and method for allowing a user to identify and locate products for purchase that include, but are not limited to, products listed in an electronic catalog. The described system and method accepts from the user, via a network, a request for product information. The system then uses the request to search a database to determine if the database contains the requested product information. If the database contains the requested product information, the product information from the database is returned, via the network, to the user. If, however, the database does not contain the requested product information, the request for product information is forwarded to a sourcing management system that initiates a search to gather the product information from third party sources. Any relevant gathered product information is returned to the user, via the network. In addition, the database or electronic catalog is updated to reflect the newly gathered product information. In this manner, the subject system and method provides users access to an open and dynamically expansible catalog.

16 Claims, 2 Drawing Sheets

SYSTEM AND METHOD FOR ELECTRONICALLY SOURCING PRODUCTS

BACKGROUND OF THE INVENTION

This invention relates generally to electronic commerce and, more particularly, relates to a system and method for electronically sourcing products and or services (hereinafter collectively referred to as "products").

As exemplified in U.S. Pat. Nos. 5,758,327 and 5,970,475, which patents are incorporated herein by reference in their entirety, systems for conducting electronic commerce on the Internet are known. As described in the referenced patents, electronic commerce systems rely on the use of Web servers through which vendors advertise and sell products. The products can include products that are delivered electronically to the purchaser over the Internet and products that are delivered through conventional distribution channels.

To allow a user to select products for delivery, the Web server provides an electronic version of a catalog that lists the items that are available to the user. In this manner, a user, who is a potential purchaser, may browse through the catalog using a Web browser and select various products that are to be purchased. When the user has completed selecting the products to be purchased, the Web server prompts the user for information to complete the ordering and delivery of the products. By way of example, this purchaser-specific information may include the name of the purchaser, the credit card number of the purchaser, and a shipping address for the order. Once an order has been placed by a user, the Web server typically confirms the order by sending a confirming Web page to the computer of the user, referred to as the Web client, and schedules shipment of the products.

Disadvantageously, the electronic catalogs currently used in electronic commerce systems are closed catalogs that limit what products a user may purchase. While the vendor may update their electronic catalog listing from time to time, the user may nevertheless only purchase those products that appear in the electronic catalog. Accordingly, a need exists for an electronic commerce system that allows users to find and purchase products beyond those listed in conventional, closed catalogs.

SUMMARY OF THE INVENTION

In accordance with this need, the subject invention is realized in a system and method for electronically sourcing products. In this regard, the system and method generally allows a user to identify and locate products for purchase that include, but are not limited to, products listed in an electronic catalog. The described system and method accepts from the user, via a network, a request for product information. The system then uses the request to search a database to determine if the database contains the requested product information. If the database contains the requested product information, the product information from the database is returned, via the network, to the user. If, however, the database does not contain the requested product information or the returned product information does not meet the needs of the requester, the request for product information can be forwarded to a sourcing management system that initiates a search to gather the product information from third party sources. Any relevant gathered product information is returned to the user, via the network. In addition, the database or electronic catalog is updated to reflect the newly gathered product information. In this manner, the subject system and method provides users access to an open and dynamically expansible catalog.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
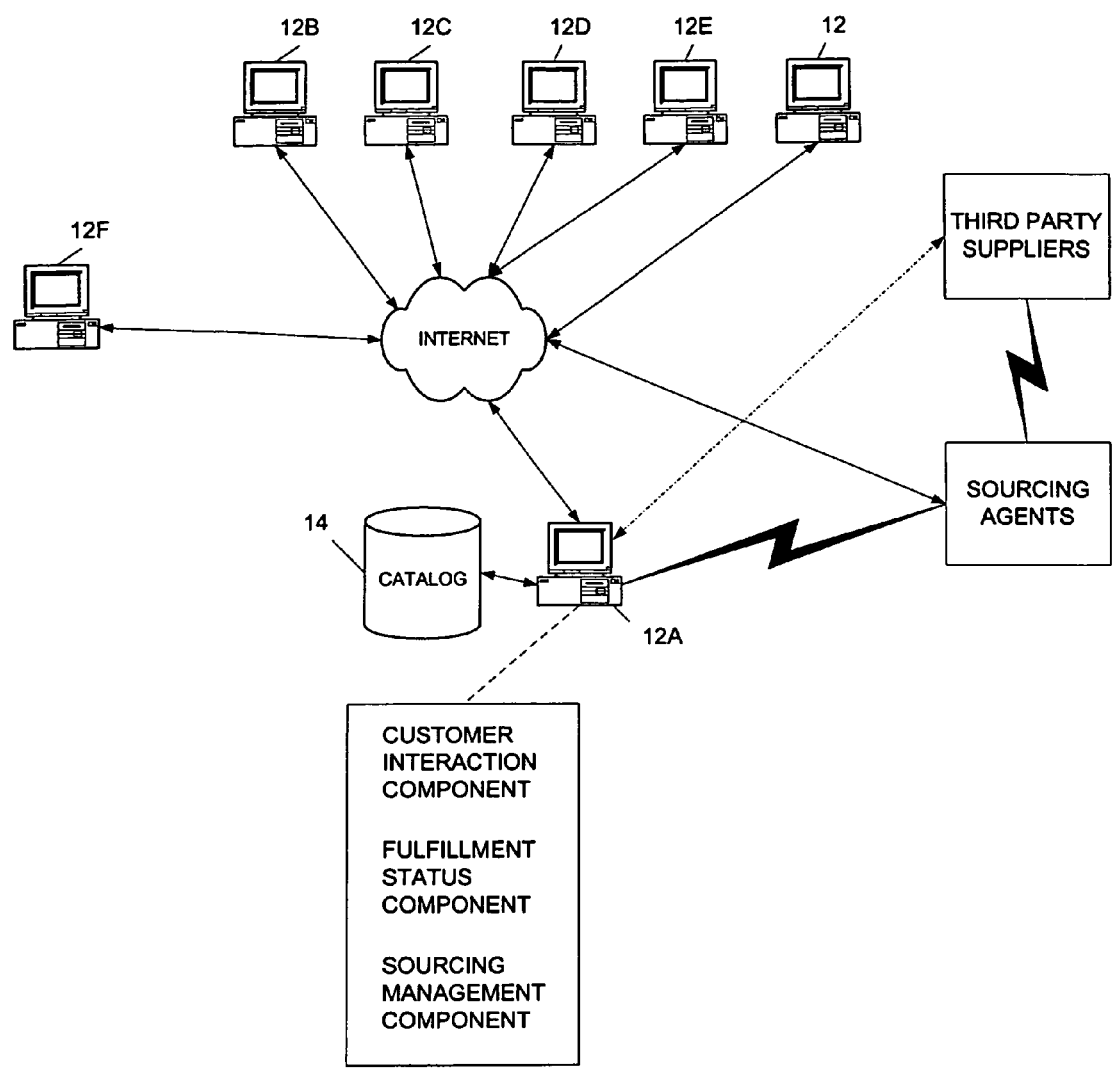
FIG. 1 illustrates a block diagram of an exemplary system for electronically sourcing products.
Figure 2:
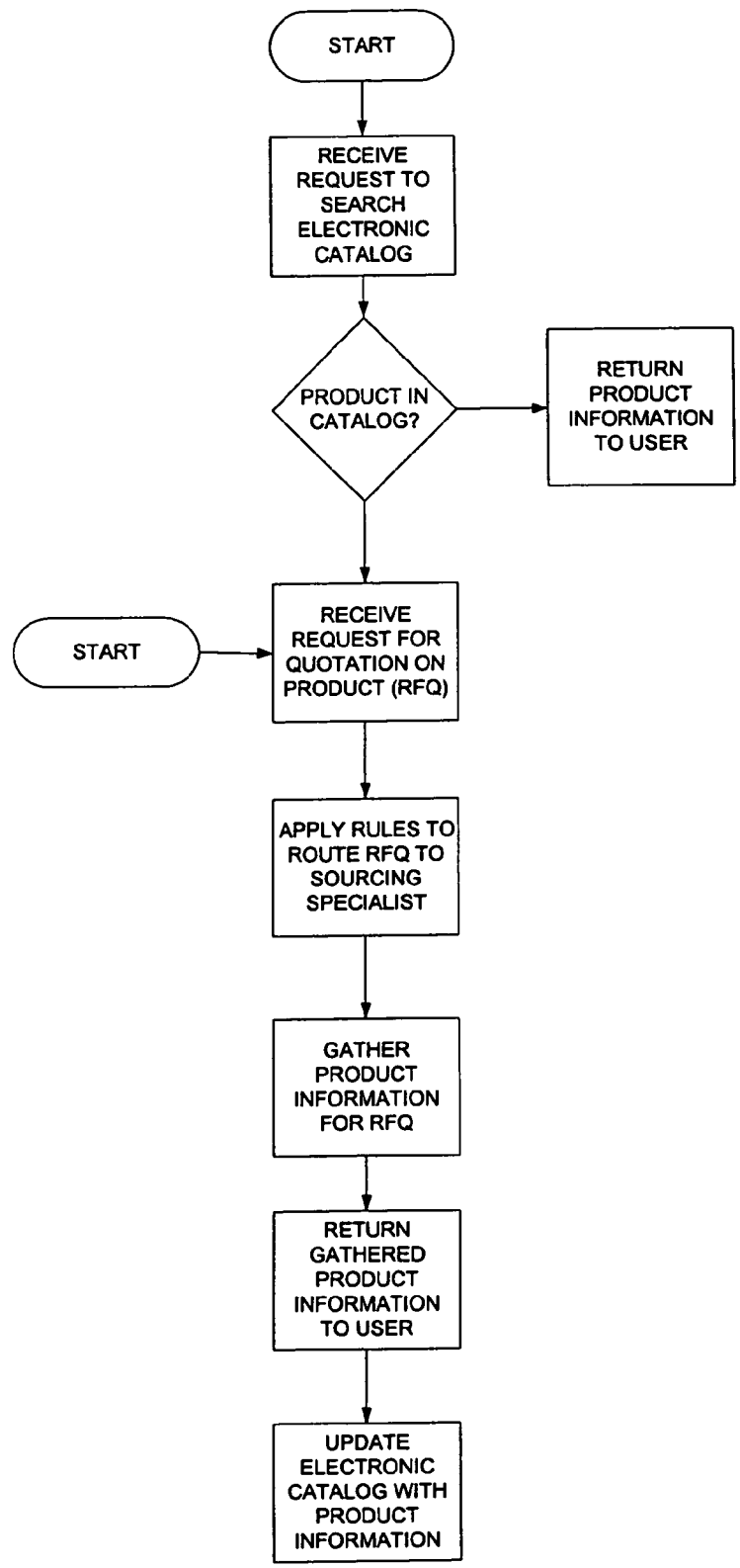
FIG. 2 illustrates a flow chart of an exemplary method for electronically sourcing products.

Turning now to the figures, wherein like reference numerals refer to like elements, there is illustrated a system and method for electronically sourcing products. Although not required, the system and method will be described in the general context of a computer network 10, illustrated in FIG. 1, and computer executable instructions being executed by general purpose computing devices 12 within the computer network 10. Those of skill in the art will appreciate that the general purpose computing devices 12 need not be limited to personal computers but may include hand-held devices, multiprocessor systems, microprocessor-based or programmable consumer electronics, minicomputers, mainframe computers, and the like. Furthermore, the computer executable instructions may include routines, programs, objects, components, and/or data structures that perform particular tasks. Within the computer network 10, the computer executable instructions may reside on a single general purpose computing device 12 or the tasks performed by the computer executable instructions may be distributed among a plurality of the general purpose computing devices 12.

For performing the tasks in accordance with the computer executable instructions, the computer network 10 is comprised of numerous general purpose computing devices 12 each of which includes a processing unit, a system memory, and a system bus that couples the system memory to the processing unit. The system memory may include a read only memory (ROM) and/or a random access memory (RAM). The general purpose computing devices 12 may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive are connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices 12.

To connect the general purpose computing devices 12 within the computer network 10, the general purpose computing devices 12 may include a network interface or adapter. It will be appreciated that the computer network may be a local area network ("LAN") or a wide area network ("WAN"). When used in a WAN, such as the Internet, the general purpose computing devices 12 typically include a modem, network interface card ("NIC"), or the like. The modem, NIC, etc., which may be internal or external, is connected to the system bus via a serial port interface. It will be appreciated that the described network connections are exemplary and other means of establishing a communications link between computers may be used.

For handling customer requests for product information, in a manner to be described in greater detail below, the computer network 10 includes one or more general purpose computing devices 12 that function as a Web server 12A. The Web server 12A is connected to a database 14 on which an electronic catalog is stored. The electronic catalog may include products from one or a plurality of different vendors of products. Users may gain access to the Web server 12A by means of general purpose computing devices 12 that function as enterprise resource planning system (ERP) portals 12B, enterprise asset management system (ESM) portals 12C, as computerized maintenance management system (CMMS) portals 12D, or as general Internet portals 12E. In the case of ERPs, ESM, and CMMS, the user indirectly access the product information server 12A by first establishing communications with an e-commerce system that, in turn, provides access to the Web server 12A. Examples of e-commerce platforms are found in systems provided by as Intelisys, Ariba or Commerce One. In the case of a general Internet portal 12E, the user directly accesses the product information server 12A by, for example, clicking on a referring Hyperlink in a displayed HTML page or by typing an Internet URL that functions to identify the Web server 12A. It is preferred that users that directly access the Web server 12A be guided through a one-time registration process while users that indirectly access the Web server 12A have their account information automatically delivered to the Web server 12A by the referring partner. In this manner, billing and shipping information for individual users may be collected and maintained by the Web server 12A.

In accordance with an important aspect of the invention, the Web server 12A includes a customer interaction component that provides a means for a user to request and obtain product information once a user gains access to the Web server 12A. The customer interaction component manages the content that the user interacts with, the searching/browsing by the user of the electronic catalog maintained in the database 14, the building of requests for quotation (RFQ) by the user, and the shopping cart of the user. In this regard, the customer interaction component of the Web server 12A generates Web pages that include pull down menus, text entry fields, etc. by which the user may return information to the Web server 12A.

To request the product information, the user is presented with a Web page that allows a user to initiate a search/browse of the electronic catalog and/or build a RFQ. Searching/browsing of the electronic catalog is performed by the Web server 12A in response to the user returning to the Web server 12A a request for product information that includes a product identifier. Examples of product identifiers include keywords or product descriptors, product part numbers, product manufacturer names, product categories, etc. If the electronic catalog has listed therein any products that correspond to the product identifier(s) entered by the user, the product information for the matching products is returned to the user via the network in one or more Web pages. In this regard, the product information returned to the user may include, but is not limited to, a product name/part number, a product picture, an availability of the product, one or more suppliers of the product, and/or product pricing. For a better understanding of the manner by which the product identifier is used to find product information within the electronic catalog maintained within the database 14, the reader is referred to co-pending U.S. patent application Ser. No. 09/625,576 to Westphal, entitled "Improved Data Storage And Retrieval Method And System," which is hereby incorporated by reference in its entirety.

To allow a user to purchase any of the products, the Web page(s) that are returned to the user in response to a request for product information may also include one or more fields/buttons/links to additional Web pages by which the user may place order(s) for the displayed product(s). The order will typically include a specification of the amount of product desired by the user, the form of payment desired by the user, the form of shipment desired by the user, and delivery address. As will be appreciated by those of skill in the art, any such orders are generally held in the shopping cart maintained by a customer interaction component of the Web server 12A until the order has been finalized.

Once an order for products has been placed by a user, the order is transmitted to a general purpose computer of a corresponding supplier of the product 12F. The order may be transmitted via EDI, email or using XML forms. In an alternative embodiment, the order may be simply transmitted via fax. Upon receipt of the order, the supplier will deliver the ordered products to the destination specified by the user. Billing and order status are preferably handled by a fulfillment status component within the Web server 12A that is in communication with the customer interaction component. The fulfillment layer may also be used to track shipping and delivery status for the user by being in contact with computers of various common carriers.

If the electronic catalog maintained within the database 14 does not include a product the corresponds to a product identifier entered by the user or the user notifies the system that any returned product information does not meet the needs of the user, the user will be provided with a Web page by which the user may build an RFQ. As noted above, the user may also access this Web page directly without first performing a search. To build an RFQ, the user will enter information that may specifically or generally describe what the user desires to procure. The information may be entered into text fields or selected from predetermined lists provided in the Web page(s). When the RFQ information is returned to the Web server 12A, the Web server 12A routes the RFQ information to a sourcing management component.

Within the sourcing management component, the information within the RFQ is compared against predetermined rules to determine a sourcing agent for the RFQ. By way of example only, the RFQ may be parsed and compared against descriptors of known product types to determine the general type of product that the user desires. The RFQ may then be routed to a sourcing agent that specializes in finding sources of the determined product type. The sourcing management component preferably routes the RFQ to the sourcing agent electronically although the RFQ may be routed using email, fax transmission, etc.

Once a sourcing agent receives a routed RFQ, the sourcing agent will contact one or more third party vendors of products to gather product information for the benefit of the user. In this regard, the sourcing agent may contact third party vendors by phone, fax or email, examine paper catalogs of vendors, and/or access on-line catalogs of vendors. Some or all of the gathered product information is returned to the user in a response to RFQ that it sent to the user via the computer network, by way of example, in an email. The response to the RFQ may be created and sent to the user directly by the sourcing agent or automatically by the sourcing management component in response to the sourcing agent supplying the Web server 12A with the gathered information. In addition, some or all of the gathered product information is also entered into the electronic catalog maintained within the database 14.

The entering of the gathered product information may be performed manually by the sourcing agent or automatically by the sourcing management component in response to the sourcing agent supplying the Web server 12A with the gathered information. The information returned to the user and entered into the database may include, but is not limited to, a product name/part number, a product picture, an availability of the product, the one or more suppliers of the product, product delivery options, and the price of the product. Upon receipt of the response to RFQ, the user may elect to contact a representative of the company operating the Web server 12A to procure the desired product in accordance with the response to RFQ.

For providing suppliers and/or users with purchasing information on buying patterns and product histories whereby suppliers/users may make improved business decisions, it is preferred that the Web server 12A track purchases and products added to the database.

As noted previously, the Web server 12A may be directly accessed from an Internet portal 12E by use of a referring Hyperlink in a Web page. In this regard, it is contemplated that the Web server 12A may be placed in a vertical connection with Web servers of various third party suppliers whereby the electronic catalog and/or RFQ builder of the subject system and method may be used to supplement the electronic catalogs of the third party suppliers. For example, if the electronic catalog of the third party supplier does not have a listed product corresponding to one a user is searching for, the third party Web server may return to the user a Web page having a link by which the user may gain access the Web server 12A. When the Web server 12A is accessed in this manner, the user may be required to register with the Web server 12A if they are a new user or, alternatively, the third party supplier may forward to the Web server 12A information that the third party supplier has previously gathered regarding the user, such as, the billing address, account information, shipping address, etc. of the user To allow suppliers to update information contained within the electronic catalog maintained within database 14, the Web server 12A allows suppliers to perform complete data maintenance from a remote general computing device 12F. To perform on-line maintenance, a supplier should be required to log-in to the Web server 12A and be verified as a valid user. Once verified as a valid user, the supplier may add items to the electronic catalog maintained within database 14, perform pricing adjustments, change product descriptions, etc.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A method of providing a customer with information regarding a product, the method comprising:
  receiving an electronic request for information for a product;
  searching an electronic database to determine if the electronic database contains information for the product; and
  when it is determined that the electronic database does not contain information for the product, automatically sending an electronic request to a sourcing agent to perform a search outside of the electronic database to gather information for the product which gathered information is returned to the customer in an electronic message and added to the electronic database.

2. The method as recited in claim 1, wherein requesting a sourcing agent to perform a search comprises forwarding the electronic request to the sourcing agent as a request for quotation.

3. The method as recited in claim 2, wherein the request for quotation is prepared by the customer in response to a prompt that is automatically sent to the customer when the electronic database does not contain information for the product.

4. The method as recited in claim 1, wherein the electronic request is received via the Internet.

5. The method as recited in claim 1, wherein the electronic request is forwarded to the sourcing agent via an email.

6. The method as recited in claim 1, comprising comparing the electronic request against a set of predetermined rules to determine the sourcing agent to which the electronic request is to be routed; and automatically routing the electronic request to the sourcing agent determined to be appropriate by the step of comparing, the sourcing agent performing a search to find a source for the product specified in the electronic request.

7. The method as recited in claim 6, wherein the step of comparing comprises comparing words in the electronic request against a set of predetermined product descriptors to determine a type of product specified in the request.

8. The method as recited in claim 6, further comprising the step of preparing an email that includes information representative of the electronic request.

9. A computer-readable medium having instruction for sourcing a product, the instructions performing steps comprising:
  receiving an electronic request specifying a product;
  searching an electronic database to determine if the electronic database contains information for the product;
  when it is determined that the electronic database does not contain information for the product, automatically comparing the electronic request against a set of predetermined rules to determine a sourcing agent to which the electronic request is to be routed; routing the electronic request to the sourcing agent determined to be appropriate by the step of comparing where the sourcing agent performs a search outside of the electronic database to find a source for the product specified in the request; receiving an electronic message from the sourcing agent including information for the product from the source; and automatically updating the electronic database with the information for the product from the source.

10. The computer-readable medium as recited in claim 9, wherein the instructions perform the further step of sending the source for the product specified in the request as determined by the sourcing agent to an originator of the request.

11. A method of providing a customer with information regarding a product, the method comprising:
  receiving an electronic request for information for a product;
  searching an electronic database to determine if the electronic database contains information for the product; and
  when it is determined that if the electronic database does not contain information for the product, performing a search outside of the electronic database to gather information for the product, sending the gathered information in an electronic message to the customer, and adding the gathered information to the electronic database.

12. A method of providing a customer with information regarding a product, the method comprising:

receiving an electronic request for information for a product;

searching an electronic database to determine if the database contains information for the product; and when it is determined that if the electronic database does not contain information for the product, providing the customer with an option to authorize a further search outside of the electronic database to gather information for the product which, if authorized, causes the performing of the further search, the returning to the customer in an electronic message the gathered information, and the adding of the gathered information to the electronic database.

13. An electronic commerce system, comprising:

an electronic catalog having product information;

a first component that accepts an electronic request for quotation for a product not contained within the electronic catalog, the first component automatically routing the request for quotation to a sourcing agent determined by the first component to be appropriate for finding a source for the product not contained within the electronic catalog; and a second component that allows a user to search the electronic catalog to gather information for a selected product and that automatically provides access to the first component when it is determined that the electronic catalog does not contain information pertaining to the selected product.

14. The system as recited in claim 13, wherein the electronic catalog and second component reside on a Web server of a third party vendor.

15. The system as recited in claim 13, further comprising a portal through which the electronic catalog, first component and second component are accessible.

16. The system as recited in claim 13, wherein the electronic catalog, first component and second component reside on a single Web server.

* * * * *